O. A. PEDERSEN.
TELEPHONE COLLECTION BOX.
APPLICATION FILED APR. 4, 1917.
1,254,533.
Patented Jan. 22, 1918.
3 SHEETS—SHEET 1.
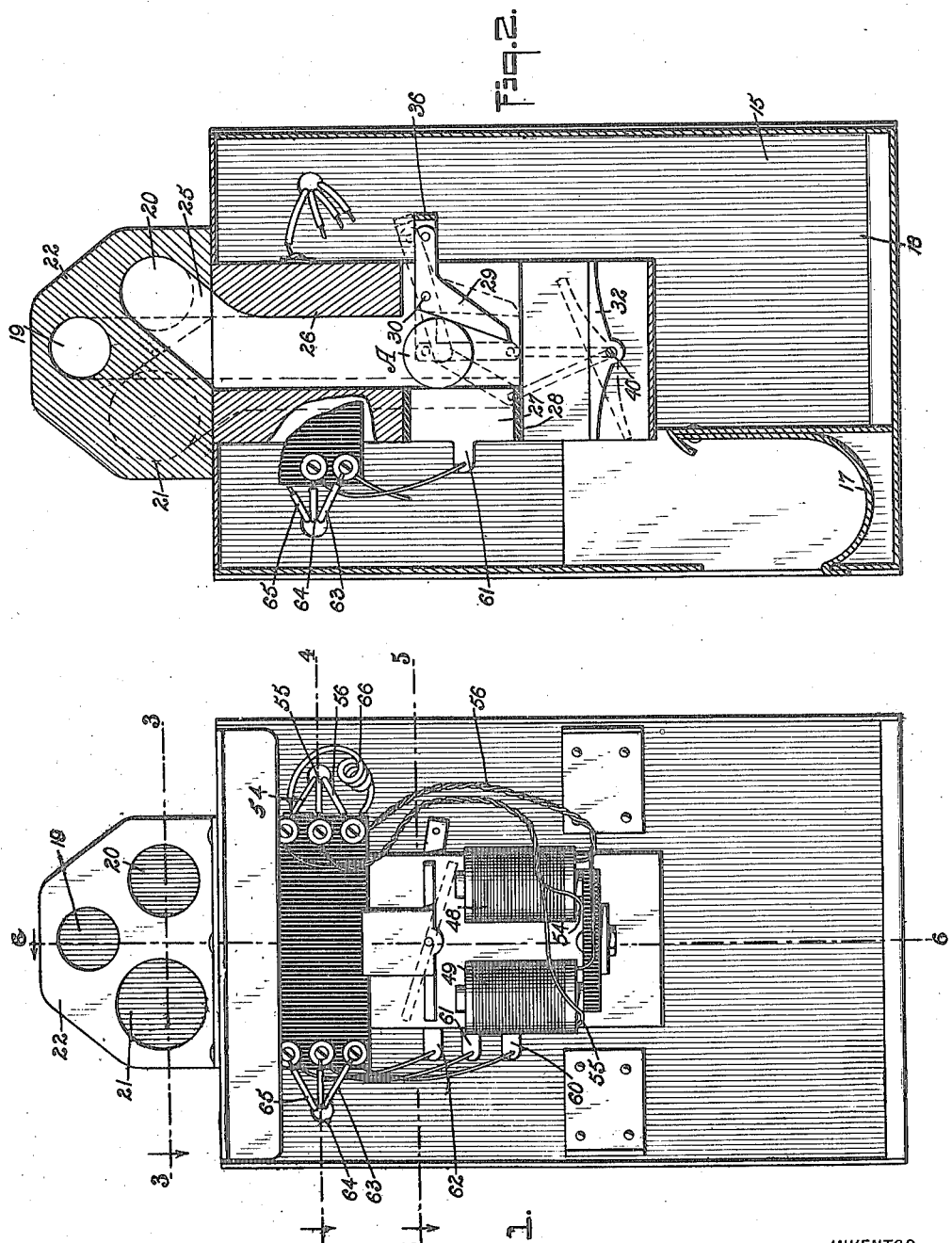
WITNESSES
INVENTOR
Oscar A. Pedersen
BY
ATTORNEYS O. A. PEDERSEN.
TELEPHONE COLLECTION BOX.
APPLICATION FILED APR. 4, 1917.
1,254,533.
Patented Jan. 22, 1918.
3 SHEETS—SHEET 2.
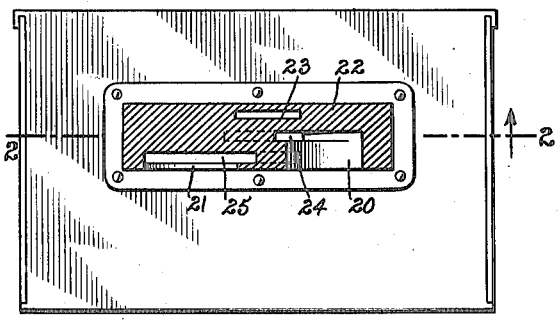
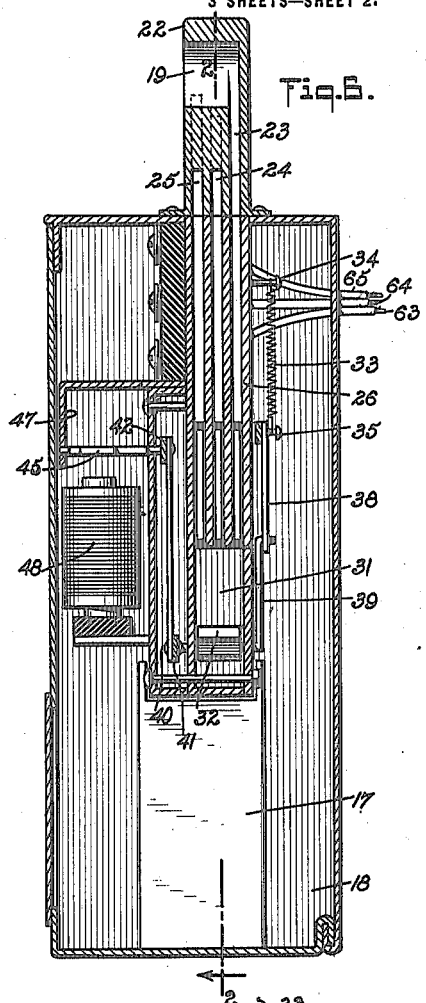
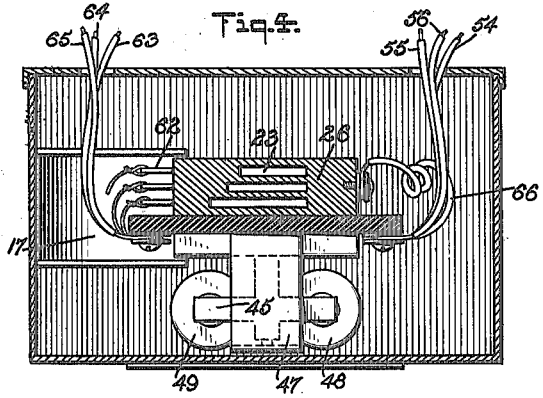
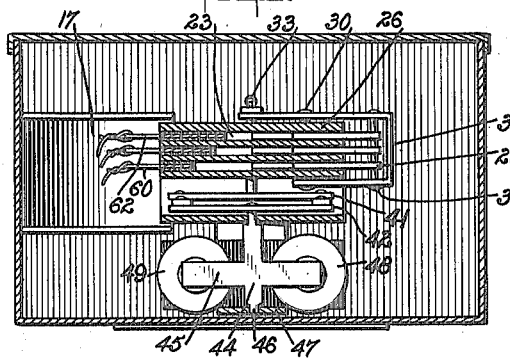
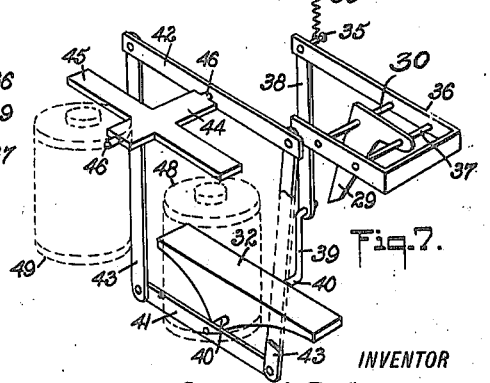
WITNESSES
INVENTOR
Oscar A. Pedersen
BY
ATTORNEYS O. A. PEDERSEN.
TELEPHONE COLLECTION BOX.
APPLICATION FILED APR. 4, 1917.
1,254,533.
Patented Jan. 22, 1918.
3 SHEETS—SHEET 3.
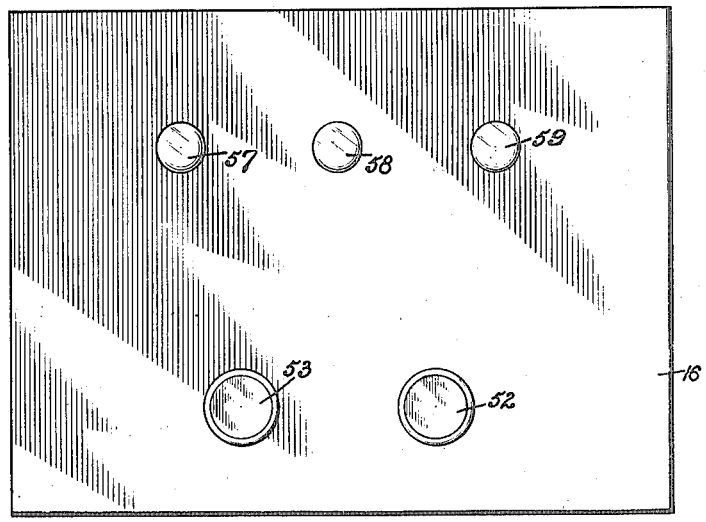
Fig. 8.
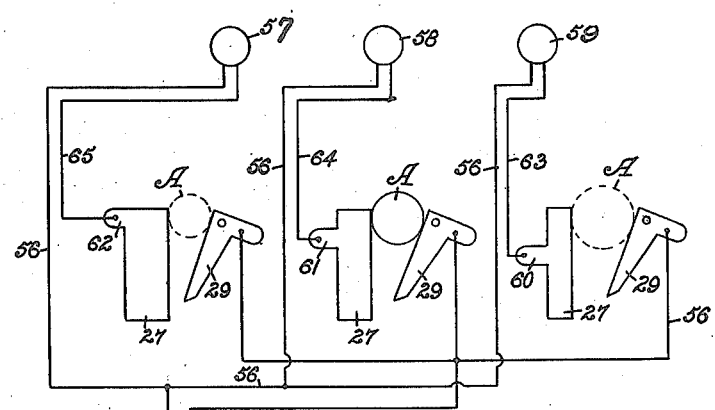
Fig. 9.
WITNESSES
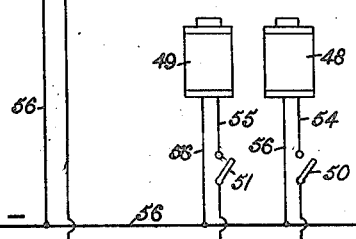
INVENTOR
Oscar A. Pedersen
BY
ATTORNEYS

UNITED STATES PATENT OFFICE.

OSCAR A. PEDERSEN, OF NEW YORK, N. Y.

TELEPHONE COLLECTION-BOX.

1,254,533.

Specification of Letters Patent. Patented Jan. 22, 1918.

Application filed April 4, 1917. Serial No. 159,631.

*To all whom it may concern:*

Be it known that I, OSCAR A. PEDERSEN, a citizen of the United States, and a resident of the city of New York, borough of the Bronx, in the county of Bronx and State of New York, have invented a new and Improved Telephone Collection-Box, of which the following is a full, clear, and exact description.

Among the principal objects which the present invention has in view are: to secure prepayment for certain forms of manually-controlled service; to disclose the amount of payment; to collect the payment after the same has been deposited; and to provide means operable from a central station for accepting or rejecting payment for service.

Drawings.

Figure 1 is a front view of a box of the character mentioned constructed and arranged in accordance with the present invention, the cover of the box being removed to show the mechanism located therein;

Fig. 2 is a vertical section, the section being taken as on the lines 2—2 in Figs. 3 and 6;

Fig. 3 is a horizontal section, the section being taken as on the line 3—3 in Fig. 1;

Fig. 4 is a horizontal section, the section being taken as on the line 4—4 in Fig. 1;

Fig. 5 is a horizontal section, the section being taken as on the line 5—5 in Fig. 1;

Fig. 6 is a vertical section, the section being taken as on the line 6—6 in Fig. 1;

Fig. 7 is a detail view in perspective showing in full lines, a portion of the collecting mechanism with which the box is provided, and in dotted lines in the same figure a portion of the actuating mechanism therefor;

Fig. 8 is a face view of a signal board employed in connection with said box;

Fig. 9 is a diagrammatic view showing means for selectively operating the collecting mechanism for admitting or rejecting the payment of service.

Description.

One preferred adaptation of the invention is for telephone service in apartment houses having local call or central switchboards. Heretofore a serious objection to the character of service mentioned has existed in the unreliability of the means for keeping a record of service and the confusion which has arisen therefrom. All disputed accounts have to be assumed by the proprietor of the building, with the result that a considerable loss for telephone service is an incident of such installation. The natural concomitant of this is that the proprietor is disinclined to provide such service. This deprives the tenants of a much desired convenience.

The present invention seeks to overcome the difficulty and to cure the objection by providing a series of local universal charge-collecting stations, or, if desired, a number of individual collecting stations. In either installation the deposit box 15 is erected at a local station. For instance, if the tenants on a certain floor of an apartment house desired, a station could be placed in the hallway of that floor. A public telephone would also be disposed at or adjacent the collecting station. The telephone system of the house would have its independent switchboard to be operated by the hall attendant for the service for which the board is provided. Adjacent the call-board of the switchboard would be mounted a collecting operating panel 16, such as shown in Fig. 8 of the drawings. One or more of the deposit boxes could be operated singly or in series from the panel 16. Each box 15 has a delivering tray 17 and a receptacle compartment 18. The payments for telephone charges are made by coins which are placed in one of the deposit openings 19, 20 and 21 provided in the chute head 22, which extends above in exposed relation to the box 15.

The head 22 is rigidly attached to the box 15 in such manner that the runways 23, 24 and 25 register with correspondingly indicated runways formed in the chute block 26. The block 26 is rigidly held in the box 15 and supports the coin-releasing, signaling and selecting mechanism with which boxes made in accordance with the present invention are provided.

The runways 23, 24 and 25 are adapted to guide coins of different denominations. The transverse dimensions of said runways correspond with the dimensions of the sections of the coins for the handling of which each of said runways is employed. Adjacent the lower end of the runways, each is provided with an electric terminal block 27. Each block 27 is insulated from the adjacent metal of the block 26 by means of inserts 28 constructed of fiber or other suitable material. Opposite the blocks 27 is a series of fingers 29, the lower ends whereof normally extend into the runways to contract or otherwise diminish the space therein and for supporting the coins in the various runways until manually released therefrom. As shown best in Fig. 2 of the drawings, a coin A is held suspended between one of the blocks 27 and one of the fingers 29.

The fingers 29 are supported by a pivot bar 30. The pivot bar 30, as shown best in Figs. 2 and 5 of the drawings, is provided with bearings in the side plates of the block 26 at the lower end thereof. The middle transverse section of the block 26 is cut away to form a pocket 31 into which the various coins are deposited when falling on the rocking gangway 32. The fingers 29 are supported in their normal position by a spring 33. The spring 33, as best seen in Fig. 6 of the drawings, is anchored to a pin 34 on the block 26, while the opposite end is secured to a pin 35 on a rocking frame 36, which frame rocks on the pivot bar 30.

The frame 36 is connected with the fingers 29 by a pin 37. The forward end of the frame 36 is pivotally connected by a link 38, with a crank arm 39, the rocking whereof depresses the end of the frame 36, normally supported by the spring 33. The crank arm 39 is extended from a pivot shaft 40, one end of which is rigidly connected to a cross bar 41 of a parallel rocking frame. The cross bar 41 is normally maintained in a horizontal position by the spring 33. The same office is performed by the spring 33 for the gangway 32.

The cross bar 41 is operatively connected with a rocking beam 42 by side links 43. This construction is best shown in Fig. 7 of the drawings. The beam 42 is rigidly attached to the cross arm 44 of a rocking armature 45. The armature 45 is pivotally mounted by the arm 44 and by the pintles 46 thereof in the bracket frame 47 best shown in Figs. 5 and 6 of the drawings.

As shown best in Fig. 2 of the drawings, the center of the gangway 32 is substantially alined with the centers of the runways 23, 24 and 25. By this arrangement the coins delivered by the said runways to the said gangway, are received on the said gangway at about the center thereof to be influenced by the inclination at which the said gangway is disposed when a coin is released. It is obvious that in accordance with the tilting of the gangway, the coin is delivered therefrom to the tray 17 or compartment 18. The gangway 32 is rocked and the fingers 29 are withdrawn by the operation of the electromagnets 48 and 49. The electromagnets 48 and 49 are operated selectively and in correspondence with the closure of switches 50 and 51, respectively. The switches 50 and 51 are best shown in Fig. 9 of the drawings. In practice they are operated manually by means of the push buttons 52 and 53 incorporated in the panel 16.

As shown best in Figs. 1 and 8 of the drawings, the electromagnets 48 and 49 are individually connected with the switches 50 and 51, by wires 54 and 55, respectively. The magnetic circuits have a ground wire 56 in common. It is obvious that as the operator closes the switch 50 or 51, by pressing the button 52 or 53, one or the other of the electromagnets 48 and 49 is energized, and attracts the juxtaposed end of the armature 45 with the result that the said armature and beam 42 are rocked to incline the gangway 32 in accord with the disposition of the said armature. As shown in the drawings, if the electromagnet 48 is energized, the resulting operation tilts the gangway 32 to deliver the coins received thereon into the compartment 18. Conversely, when the button 53 is manipulated to close the switch 51 and the magnet 49 is energized, the gangway 32 is rocked to deliver the coins to the tray 17.

The common wire 56 is preferably utilized in the lighting circuits in which are incorporated the electric glow lamps 57, 58 and 59. The lamps 57, 58 and 59 are mounted on the panel 16, and are incorporated in the metallic circuits embodying the terminal blocks 27 and the tabs 60, 61 and 62, which, together with wires 63, 64 and 65, constitute the selective light signaling circuits. The wire 56 is metallically connected by a jumper 66, as best shown in Fig. 1 of the drawings, with said lighting circuits and is used as a common return therefor. Any suitable source of electric current is employed. As shown in Fig. 9 of the drawings, the usual city supply mains are indicated by the plus (+) and minus (−) signs.

*Operation.*

When a building has installed therein a telephone call box constructed and arranged as above described and as shown in the accompanying drawings, the operation is as follows: By specially arranged signals or by the usual method of lifting the transmitter of a telephone instrument, the telephone operator at the main switchboard is advised in the usual method of the need for a telephonic connection. On receipt of the information necessary to make the connection, the switchboard operator requests the party telephoning to place the necessary coin in one of the openings 19, 20 and 21. These openings are spaced in accordance with the dimensions of the coins representing the charges of service of the various zones. As the coin is deposited, it completes the lighting circuit in one or the other of the lamps 57, 58 and 59 by contacting with the correct couple formed by each of the blocks 27 and its corresponding opposed finger 29. The fingers 29 are incorporated in the electric circuit with the wire 56.

According to the light flashed, the operator is apprised of the deposit of the charge and of the correctness of the deposit made. Thus, if the call is a local call and the coin to be used is a five-cent piece, it is placed in the opening 20 which corresponds in size therewith. The opening 20 corresponds in operation with the lamp 58 in that a coin placed in the opening 20 will cause a glow in said lamp 58. If the charge is long distance and requires a quarter, this is placed in the opening 21 and the lamp corresponding therewith in operation is the lamp 59. The opening 19 corresponds in diameter to the dime.

In this manner the operator is made aware—(1) of the deposit of the coin, and (2) of the character of the coin. The operator may now get the call for the party using the telephone, and having obtained proper connections, he presses the button 52 on the panel 16 to close the switch 50 and energize the electro-magnet 48. Energizing the electromagnet 48 tilts the gangway 32 to deposit the coin when received on the said gangway in the compartment 18. The rocking of the gangway 32 as above described precedes the withdrawal of the fingers 29 to release the coins held by the said fingers. Therefore it is obvious that the gangway 32 is properly tilted when the coins are deposited thereon.

Should it so happen that the telephone operator is unable to procure the proper connections due to "wire busy," "service discontinued," or for any other reason, he presses the button 53, which results in tilting the gangway 32 to deliver the coin dropped from the runways 23 to 25, inclusive, into the tray 17 where the coin may be reclaimed by the telephone user.

I claim—

1. A telephone collection box comprising a plurality of separate coin-receiving chutes; a plurality of rocking fingers for supporting coins deposited in said chutes and at the lower extremity thereof, said fingers each extending in line with and across the path of one of said chutes; a plurality of terminal blocks, said blocks equaling in number and disposed in parallel relation to said fingers, each of said blocks coöperating with one of said fingers for supporting the coins deposited in said chutes; and a plurality of electric circuits, each incorporating one of said blocks, and a signal device to be operated by a coin when mechanically connecting one of said blocks and one of said fingers; a rocking member mechanically connected with said fingers for rocking the same to remove them from the path of said chutes and from supporting relation to coins; and an electric circuit embodying an electromagnet operatively related to said rocking member, and a manually controlled switch disposed in service relation to said signal devices, the closure of which energizes said electromagnet to oscillate the rocking member and associate parts for the release of any coins which may be supported by said fingers.

2. A telephone collection box comprising a plurality of separate coin-receiving chutes; a plurality of rocking fingers for supporting coins deposited in said chutes and at the lower extremity thereof, said fingers each extending in line with and across the path of one of said chutes; a plurality of terminal blocks, said blocks equaling in number and disposed in parallel relation to said fingers, each of said blocks coöperating with one of said fingers for supporting the coins deposited in said chutes; a plurality of electric circuits, each incorporating one of said blocks, and a signal device to be operated by a coin when mechanically connecting one of said blocks and one of said fingers; a rocking member operatively connected with said fingers for rocking the same to remove them from the path of said chutes and from supporting relation to coins, said rocking member being adapted to rock in opposite directions for delivery of said coins in opposite directions; and a plurality of electric circuits, each embodying an electromagnet operatively related to said rocking member, and a plurality of manually controlled switches for closing said circuits, said circuits being adapted for rocking said rocking member in opposite directions for delivering the released coins in opposite directions.

OSCAR A. PEDERSEN.